United States Patent [19]

Hughes et al.

[11] 4,061,847

[45] Dec. 6, 1977

[54] ETHYLENE POLYMER ACIDIFICATION PROCESS

[75] Inventors: Richard H. Hughes, Overland Park; Donald R. Jamieson, Merriam, both of Kans.; Rajindar K. Kochhar, Katy, Tex.

[73] Assignee: Gulf Research & Development Company, Pittsburgh, Pa.

[21] Appl. No.: 350,557

[22] Filed: Apr. 12, 1973

Related U.S. Application Data

[63] Continuation of Ser. No. 48,436, June 22, 1970, abandoned.

[51] Int. Cl.$^2$ .......................... C08F 8/30; C08F 8/44
[52] U.S. Cl. ........................................ 526/49; 526/16; 526/52; 526/240
[58] Field of Search ...................... 260/88.1 R; 526/52

[56] References Cited

U.S. PATENT DOCUMENTS 3,553,178  1/1971  Clampitt et al. ................ 260/88.1 R

*Primary Examiner*—Harry Wong, Jr.
*Attorney, Agent, or Firm*—Richard L. Kelly

[57] ABSTRACT

Without changing the physical form of the ethylene polymer, the pendant carboxylate salt groups of an ethylene polymer are converted to the acid form by introducing an article of manufacture having at least a surface comprising an ethylene polymer containing pendant metallic carboxylate salt groups into an aqueous medium containing dissolved ammonia.

2 Claims, No Drawings

ETHYLENE POLYMER ACIDIFICATION PROCESS

This is a continuation of application Ser. No. 48,436, filed June 22, 1970, now abandoned.

BACKGROUND OF THE INVENTION

Ethylene polymers containing pendant metallic carboxylate salt groups have been employed in the preparation of films which are in turn widely used in the packaging field. Films produced from such ethylene polymers are strong and have good barrier properties. A deficiency noted with respect to the use of such films in particular applications is that the films show high water absorption or moisture permeability. Although such water vapor permeability may be accepted for certain applications, this characteristic is particularly undesirable in other fields.

A method for overcoming the moisture permeability of such ethylene polymer films has been described in U.S. Pat. No. 3,511,799. As described therein, aqueous dispersions of self-emulsifiable ethylene polymers containing pendant metallic carboxylate salt groups are contacted with a strongly acidic cation exchange resin charged with ammonium ions and the ammonium ions are exchanged for the metallic cations of the ethylene polymer. The product of the ion exchange process is an ethylene polymer containing pendant ammonium salt groups which readily decompose to the acid. Films produced from these ethylene polymers containing pendant acid groups have low moisture-vapor transmission and excellent heat-seal characteristics and thus have wide application in the packaging field.

Direct preparation of such ethylene polymers containing pendant acid groups, particularly where the concentration of acid groups is relatively high, is extremely difficult. For example, in the preparation of ethylene-acrylic acid copolymers by a polymerization process, the different polymerization rates of the acrylic acid and ethylene monomer moieties and the corrosive action of the acrylic acid makes the commercialization of such direct polymerization processes generally unfeasible. Consequently, ethylene polymers containing high concentrations of pendant acid groups are normally prepared by a two-step process comprising, in the first step, a high-pressure, free-radical polymerization of ethylene and a comonomer containing pendant ester groups. Such high-pressure, free-radical polymerization processes are generally continuous processes conducted in an autoclave or tubular-type reactor. A suitable method for preparing such copolymers is described in U.S. Pat. No. 3,350,372.

In the second step, the ethylene polymers containing pendant ester groups are subjected to a conversion process such as the hydrolysis process described in U.S. Pat. No. 3,485,785. As described therein, ethylene-alkyl acrylate copolymers are hydrolyzed by the action of a metallic base in an aqueous medium at elevated temperatures to provide, in one embodiment, an ethylene polymer containing pendant metallic carboxylate groups. The ethylene polymer containing pendant metallic carboxylate groups is generally self-emulsifiable and dispersed throughout the aqueous medium. Conversion of the pendant carboxylate groups to the acid form is effected by the addition of an acid to the aqueous medium, thereby converting the carboxylate salt groups to the acid form and simultaneously coagulating the dispersed ethylene polymer. To effect conversion of the pendant carboxylate salt groups to the acid form, it has been necessary to change the physical form of the ethylene polymer.

Accordingly, an object of the invention is to provide an improved process for the conversion of pendant carboxylate salt groups of an ethylene polymer to the acid form.

Another object of the invention is to provide a process for the conversion of pendant carboxylate salt groups to the acid form of an ethylene polymer, said ethylene polymer comprising at least the surface of an article of manufacture.

Yet another object of the invention is to provide a process for the conversion of pendant carboxylate salt groups of an ethylene polymer to the acid form wherein said ethylene polymer forms at least the surface of an article of manufacture, said conversion conducted without changing the physical form of the article of manufacture.

Other objects, advantages and features of this invention will be readily apparent to those skilled in the art from the following description and appended claims.

SUMMARY OF THE INVENTION

By the invention pendant metallic carboxylate salt groups of an ethylene polymer comprising at least the surface of an article of manufacture are converted to the acid form by introducing the ethylene polymer into an aqueous medium containing dissolved ammonia and recovering therefrom the article of manufacture in the same form as introduced into the aqueous medium.

DESCRIPTION OF THE INVENTION

The invention is applicable to articles of manufacture wherein at least the surface of the article of manufacture comprises an ethylene polymer containing pendant metallic carboxylate salt groups. The ethylene polymer can comprise only the surface of the article of manufacture, being bonded to the substrate by conventional methods of application, or the article of manufacture can be fabricated entirely from the ethylene polymer such as in the case of films. The invention is equally applicable to articles of manufacture prepared by coating, molding, extrusion processes and the like.

The ethylene polymers of the invention are those polymers wherein the concentration of ethylene is at least 2 mols per mol of contained pendant metallic carboxylate salt groups. Normally, the concentration of pendant metallic carboxylate salt groups will range from 0.01 to 0.5 mol per mol of contained ethylene. The invention is particularly applicable to articles of manufacture wherein at least the surface of the article of manufacture comprises an ethylene polymer containing a concentration of from about 0.05 to 0.5 mol of pendant metallic carboxylate salt groups per mol of contained ethylene.

The invention is applicable to ethylene polymers containing metallic cations which are soluble in water or which form a water-soluble complex with ammonia. The invention is particularly applicable to ethylene polymers containing pendant alkali metal carboxylate salt groups.

The ethylene polymers containing pendant metallic carboxylate salt groups can be prepared by processes known in the art. For example, ethylene can be copolymerized with an ester of acrylic, methacrylic, maleic, fumaric, or itaconic acid and the resulting copolymer hydrolyzed by a process such as described in U.S. Pat. No. 3,249,570, to provide an ethylene polymer containing pendant metallic carboxylate salt groups. The product polymer so formed thus becomes essentially an ethylene polymer chain containing substituent or pendant metallic carboxylate salt groups randomly distributed along the polymer chain. In addition to pendant metallic carboxylate salt groups, the polymer can contain other functional groups such as acid, amide and ester groups.

The invention will now be described as it relates to a specific embodiment, although as indicated above and hereafter defined, it is not intended to limit the invention thereto. A film of an ethylene polymer containing pendant metallic carboxylate salt groups is introduced into an aqueous medium containing from 0.5 to 28 weight percent dissolved ammonia. Preferably, the ammonia will be present in the aqueous medium as ammonium hydroxide. The reaction proceeds rapidly at ambient temperatures.

The film is maintained in the aqueous medium for a period of time of at least 1 minute. By maintaining the film in the aqueous medium for 1 minute, at least the pendant metallic carboxylate salt groups of the film surface are converted to the acid form. Normally, maintaining the film in the aqueous medium for a period of time ranging from about 2 to about 30 minutes will result in substantially complete conversion of the metallic carboxylate salt groups to the acid form. It will be appreciated by those skilled in the art that for complete conversion of all pendant metallic carboxylate salt groups in articles of manufacture fabricated from ethylene polymers containing such pendant metallic carboxylate salt groups, it may be necessary to maintain the article of manufacture in the aqueous medium for longer periods of time.

Following conversion of the pendant metallic carboxylate salt groups to the acid form, the ethylene polymer film is withdrawn from the aqueous medium. A comparison of the film introduced into the aqueous medium and the film withdrawn from the aqueous medium shows that there has been no substantial change in the physical form of the film, that is to say that the size and shape of the article of manufacture introduced into the aqueous medium and withdrawn from the aqueous medium is substantially the same. The pendant metallic carboxylate salt groups of at least the surface of the ethylene polymer film withdrawn from the aqueous medium have been converted to the acid form.

The following examples are presented to illustrate the advantages and features of the invention. It is not intended, however, to limit the invention to the specific embodiments described therein.

EXAMPLE I

A 1 mil film of an ethylene polymer was introduced into water containing 16 mol percent ammonium hydroxide. The ethylene polymer of the film was prepared by the hydrolysis of an ethylene-methyl acrylate (20 weight percent methyl acrylate) copolymer to provide an ethylene polymer wherein 50 percent of the pendant acrylate groups had been converted to the sodium salt form, 15 percent of the pendant acrylate groups had been converted to the acid form, and 35 percent of the pendant acrylate groups had been converted to the amide form.

The ethylene polymer film in substantially the same physical form as introduced into the aqueous medium was withdrawn from the aqueous medium after 1 minute. Infrared analysis of the ethylene polymer film withdrawn from the aqueous medium indicated that 25 percent of the pendant sodium salt groups had been converted to the acid form.

EXAMPLE II

The experiment of Example I was repeated with the exception that the film was maintained in the aqueous medium containing the ammonium hydroxide for a period of 5 minutes. Infrared analysis of the film withdrawn from the aqueous medium indicated that substantially complete conversion of the sodium salt groups to the acid form had been effected.

Although the invention has been described with reference to specific materials, embodiments and details, various modifications and changes, within the scope of this invention, will be apparent to those skilled in the art and are contemplated to be embraced in the invention.

What is claimed is:

1. A method for chemically modifying at least the surface of a film of an ethylene copolymer containing pendant metallic carboxylate salt groups without changing the physical form of said film which consists essentially of, in combination,
    1. immersing a film of an ethylene copolymer containing pendant metallic carboxylate salt groups into an aqueous ammonium hydroxide solution containing 0.5 to 28 weight % ammonia,
    2. maintaining said film in said aqueous ammonium hydroxide solution at ambient temperature for a period of 1 to 30 minutes,
    3. removing said film from said aqueous ammonium hydroxide solution,
    4. drying the film from (3), and
    5. recovering a film in which a substantial proportion of the pendant metallic carboxylate salt groups of the ethylene copolymer has been converted to the corresponding carboxylic acid groups;

said ethylene copolymer consisting of at least 67 mol % of polymerized ethylene and containing from 0.01 to 0.5 mol of pendant metallic carboxylate salt groups, per mol of ethylene, the metallic cation of the carboxylate salt groups being selected from the group consisting of metallic cations which are soluble in water or which form a water-soluble complex with ammonia.

2. The process of claim 1 wherein the pendant metallic carboxylate salt groups of the ethylene copolymer are alkali metal carboxylate salt groups.

* * * * *